(12) United States Patent
Head (10) Patent No.: US 7,670,451 B2
(45) Date of Patent: Mar. 2, 2010

(54) COILED TUBING AND POWER CABLES

(75) Inventor: Philip Head, Greater London (GB)

(73) Assignee: Artificial Lift Company Limited, Norfolk (GB)

( * ) Notice: Subject to any disclaimer, the term of this patent is extended or adjusted under 35 U.S.C. 154(b) by 0 days.

(21) Appl. No.: 12/088,507

(22) PCT Filed: Sep. 20, 2006

(86) PCT No.: PCT/GB2006/050298

§ 371 (c)(1),
(2), (4) Date: Jul. 21, 2008

(87) PCT Pub. No.: WO2007/034242

PCT Pub. Date: Mar. 29, 2007

(65) Prior Publication Data

US 2008/0308280 A1    Dec. 18, 2008

(30) Foreign Application Priority Data

| Sep. 24, 2005 | (GB) | 0519567.2 |
| Oct. 19, 2005 | (GB) | 0521157.8 |
| Oct. 25, 2005 | (GB) | 0521717.9 |
| Nov. 15, 2005 | (GB) | 0523229.3 |
| Nov. 25, 2005 | (GB) | 0524010.6 |
| Dec. 14, 2005 | (GB) | 0525425.5 |
| Feb. 6, 2006 | (GB) | 0602321.2 |
| Jul. 13, 2006 | (GB) | 0613864.8 |

(51) Int. Cl.
*H01B 7/20* (2006.01)

(52) U.S. Cl. ............ 156/293; 156/54; 156/51; 156/52; 156/53; 156/308.4; 166/77.2; 166/75.11; 166/242.2; 174/28; 174/79; 174/105 R; 174/85; 174/131 R; 174/131 A (58) Field of Classification Search ......... 166/77.2, 166/75.11, 242.2; 174/28, 79, 105 R, 85, 174/131 R, 131 A; 156/54, 308.4, 48, 51, 156/52, 53, 293

See application file for complete search history.

(56) References Cited

U.S. PATENT DOCUMENTS

| 5,191,173 | A | | 3/1993 | Sizer et al. ............... 174/105 |
| 5,269,377 | A | * | 12/1993 | Martin ................. 166/385 |
| 5,821,452 | A | | 10/1998 | Neuroth et al. ............ 174/28 |
| 5,996,689 | A | | 12/1999 | Head ..................... 166/77.2 |
| 6,103,031 | A | * | 8/2000 | Aeschbacher et al. ....... 156/54 |
| 6,727,828 | B1 | | 4/2004 | Malone et al. .......... 340/854.9 |
| 2005/0121094 | A1 | | 6/2005 | Quigley et al. ............ 138/125 |

* cited by examiner

*Primary Examiner*—Jeff H Aftergut
*Assistant Examiner*—Jaeyun Lee
(74) *Attorney, Agent, or Firm*—Andrew Wilford (57) ABSTRACT

A cable is installed in coiled tubing for use in. downhole wells; the cable having an expandable jacket (22) extruded around it. After being installed in the coiled tubing, and the expandable jacket is caused to expand, securing the cable in the coiled tubing. The expandable jacket is caused to expand by the application of heat or by the application of a liquid hydrocarbon. The expandable jacket may be discontinuous along the length of the power cable, discontinuous portions being provided by interspersing the expandable jacket with sections non-expandable material.

7 Claims, 13 Drawing Sheets

Every 30ft place inert packing material

Figure 9b

21   Figure 9a   plane XX

Then extrude EPDM jacket over entire cable as done now

Figure 10b

Figure 10a   plane YY

Tape wrap around conductors

FIG 13

Then extrude EPDM jacket over entire cable as done now

COILED TUBING AND POWER CABLES

CROSS REFERENCE TO RELATED APPLICATIONS

This application is the US national phase of PCT application PCT/GB2006/050298, filed 20 Sep. 2006, published 29 Mar. 2007 as WO 2007/034242, and claiming the priorities of
British application 0519567.2 filed Sep. 24, 2005,
British application 0521157.8 filed Oct. 19, 2005,
British application 0521717.9 filed Oct. 25, 2005,
British application 0523229.3 filed Nov. 15, 2005,
British application 0524010.6 filed Nov. 25, 2005,
British application 0525425.5 filed Dec. 14, 2005,
British application 0602321.2 filed Feb. 6, 2006, and
British application 0613864.8 filed Jul. 13, 2006, whose entire disclosures are herewith incorporated by reference.

This invention relates to a conduit and a coiled tubing system for operating and deploying a powered device in a well.

Coiled or continuous reel tubing has been used in the oil industry for the last 20-30 years. The fact that it is a continuous single tube provides several advantages when entering a live oil or gas well which could have anything up to 7,000 psi well head pressure. This means the well does not have to be killed, (i.e. a heavy fluid does not have to be pumped down the production tubing to control the oil or gas producing zone by the effect of its greater hydrostatic pressure). Continuous tubing has the advantage of also being able to pass through the tubing through which the oil and/or gas is being produced, not disturbing the tubing in place.

Since its introduction, the uses and applications for coiled tubing have grown immensely, and now, rather than just being used to circulate various fluids in a well bore, it is not uncommon for coiled tubing to be used for conveying various hydraulically powered tools and more recently electrically powered tools on its end into the well. This has resulted in conventional electrical wire-line logging cables or small hydraulic conduits being inserted into the inside of the reel of tubing so that these more sophisticated tools and services can be performed.

High voltage power cables are typically composed of relatively copper, and the resulting weight means that they are usually unable to support their own weight over a vertical distance of approx 2500 ft. Various solutions have been suggested, but each have there drawback, mainly associated with the cost and time to mechanically anchor the cable to the coiled tubing.

It is an object of the present invention to provide a convenient means of allowing a cable to be installed in a conduit or coiled tubing system.

According to the present invention, there is provided a method of installing a cable in coiled tubing for use in downhole wells and the like, wherein an expandable jacket is extruded around the cable, the cable and expandable jacket are installed in the coiled tubing, and the expandable jacket is caused to expand, securing the cable in the coiled tubing.

According to another aspect of the present invention, there is provided a method of installing a cable in coiled tubing for use in downhole wells and the like, wherein the cable is installed in the coiled tubing, and a settable material is pumped in the annulus between the cable and the coiled tubing.

According to another aspect of the present invention, there is provided a method of installing a cable in coiled tubing for use in downhole wells and the like, wherein the cable is secured to tubular conduits, and the cable is installed in the coiled tubing, the tubular conduits being expanded so as to secure the cable in place in the coiled tubing.

The following is a more detailed description of some embodiments of the invention by way of example, reference being made to the accompanying drawings, in which.

Figure 1:
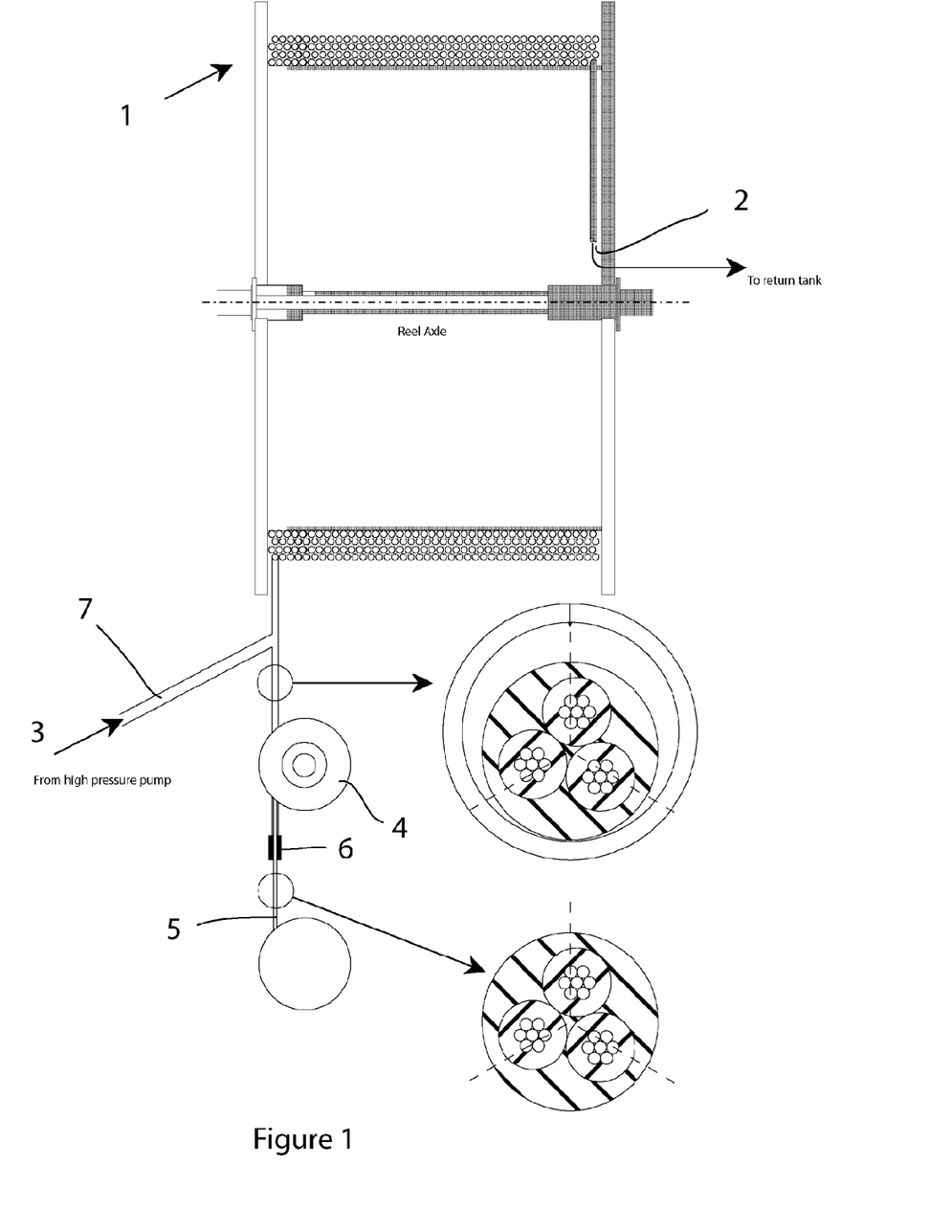
FIG. 1 shows a section end view of a coiled tubing reel with a reel of cable being installed using a cable injection tool.

Referring to FIG. 1, a reel of coiled tubing has been manufactured by seam welding a strip of steel, normalising it and storing it on a drum as shown by 1. The inner most end of the coiled tubing is connected via a hose not shown to a return fluid tank.2. The outer most end 3. is connected to a cable injection machine 4. A power cable 5 is passed through a pressure seal 6 into the inside of the cable injection machine. The power cable comprises three seven-strand conductors 8 each surrounded by an insulating layer 9, all of which is encapsulated in a cable jacket 11. The cable injection machine consists of a capstan wheel around which the power cable is wrapped, so as the capstan is turned it pulls the cable into the reel, overcoming the force applied by the seal 6. Fluid is pumped under high pressure 7 around the cable and by viscous drag draws the cable into the reel. In this regard, the cable installation method shown in EP0565287 may be followed.

Figure 2:
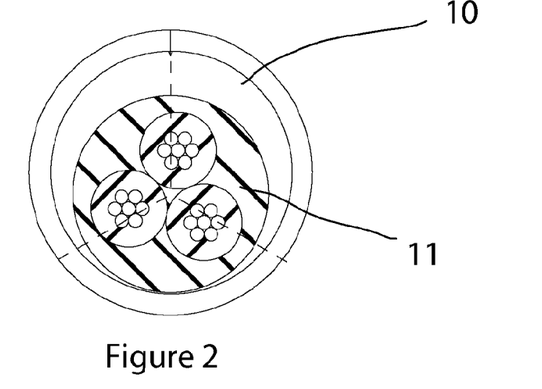
FIG. 2 shows a cross section of the coiled tubing with a power cable lying to one side.
Figure 3:
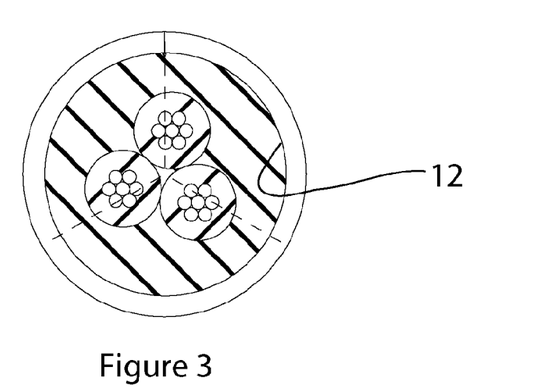
FIG. 3 shows the same view as FIG. 3, with the jacket swelled by exposure to hydrocarbon.

Referring to FIGS. 2 and 3, once the entire cable is installed, diesel or other suitable hydrocarbon 10 is pumped into the coiled tubing, after a period of time the power cable jacket starts to expand, and occupies the annular space previously occupied by the diesel. The cable is now supported virtually along its entire length via intimate contact between itself and the ID of the coiled tubing 12. This also has the added benefit of centralising the cable, so that it occupies the same pitch circle diameter as the coiled tubing, so eliminating any capstan effects.

The cable need not follow the inner circumference on the coiled tubing while on the reel, but may follow a wavy path inside the coiled tubing so that there is some slack as the cable is centralised. The swelling of the elastomer jacket is sufficient slow for the cable length to adjust to its position as it is centralised. The swelling of the elastomer will typically take place from one end of the cable to the other, the cable where the oil is introduced being in contact with the oil for longer. As the elastomer swells, excess unabsorbed oil is pushed down the coiled tubing, although small pockets of oil will not adversely affect the systems performance.

The elastomer for the cable's jacket is chosen to swell a sufficient amount to occupy the whole if the cross section of the coiled tubing. Elastomer chosen for down hole use typically have a volume swell of less than 35% in the presence of hydrocarbons; such an elastomer may be chosen here for the insulating coating 9 directly around the seven-strand conductor 8. The jacket 11 surrounding the cable however is ideally chosen to have a greater volume swell. Such elastomers include ethylene-propylene, natural rubber, butadiene rubber, styrene butadiene rubber, chloroprene rubberchlorosulphnated polyethylene, and some silicone rubbers such as MQ, VMQ and PVMQ.

Obviously, such elastomers must also be chosen for the necessary heat resistance, which will favour the silicone rubbers.

Although this embodiment shows the cable jacket being expanded while the cable and coiled tubing are located on a wound reel, the cable jacket could be swelled whilst the cable and coiled tubing are in a straight or uncoiled position.

Figure 4:
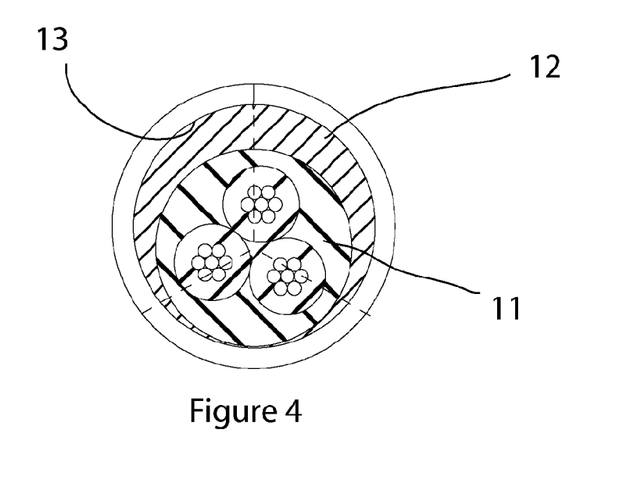
FIG. 4 shows a cross section of another embodiment of the coiled tubing and power cable.

Referring to FIG. 4, as an alternative to pumping diesel or a similar fluid into the annulus between the cable and the coiled tubing, after the entire cable has been installed, a two part settable material 12 is pumped into the space 10 between the coiled tubing and the power cable. The setting time for this material can be adjusted to accommodate long lengths and hence the pumping time required. The settable material once set has to still have a degree of flexibility as the coiled tubing is straightened to be lowered into the well, and it would be undesirable if it cracked. In addition the two part material has to withstand very high temperature when it is in the well, 300 F would not be unusual. Once set the cable 11 would be supported virtually along its entire length via intimate contact between itself and the ID of the coiled tubing 13.

A two part settable material will usually be used, but any time delayed settable materials are suitable. A suitable material for use as the settable material is ThermaSetR™ produced by WellCem AS.

Figure 5:
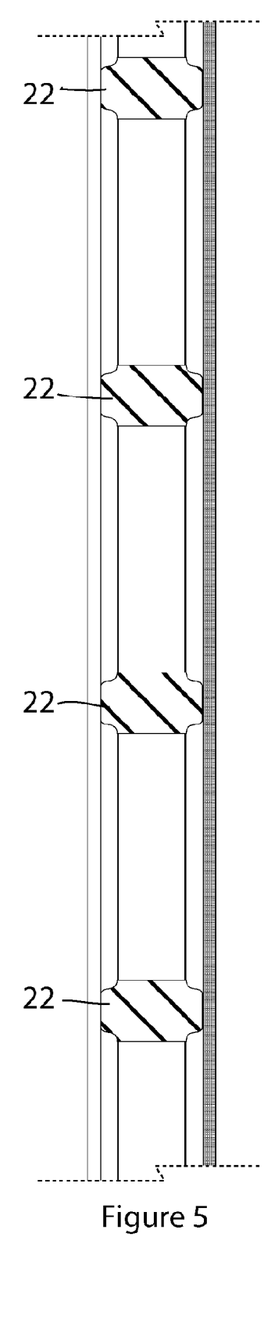
FIGS. 5 and 6 show longitudinal views of the cable and jacket installed in coiled tubing.
Figure 6:
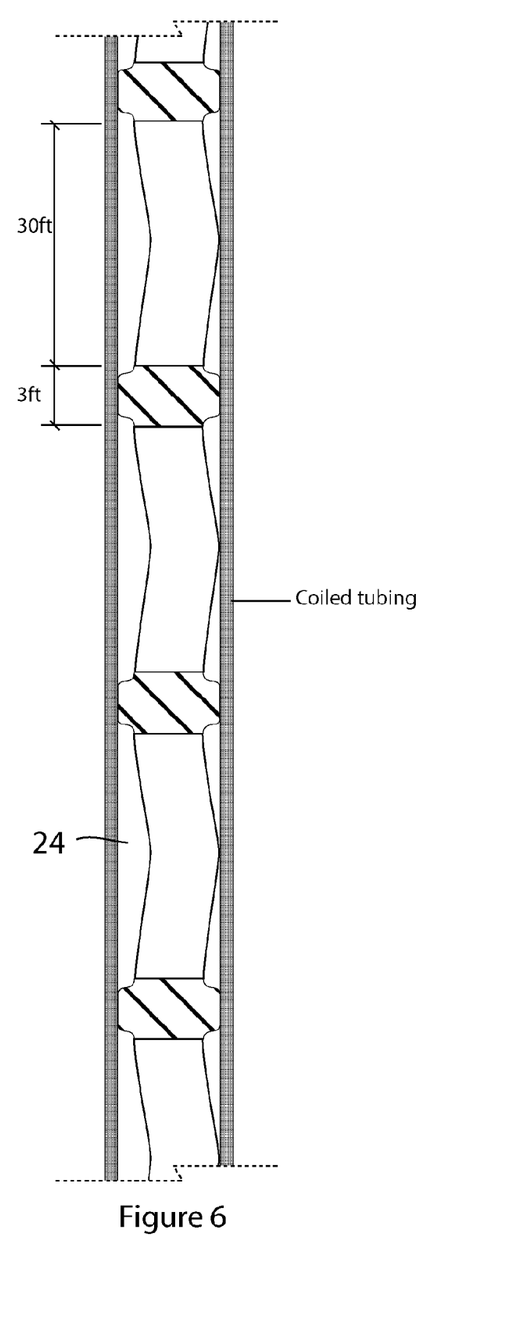

Referring back to FIG. 1, the power cable consists of copper conductors 10, electrical insulation 11, a EDPM jacket 12 which has been formulated to be highly swelling when exposed to diesel. It may further include a nylon or PTFE jacket 13 which prevents the jacket from seeing the diesel. Prior to being installed inside the coiled tubing, every 30 ft or so a section of protective barrier layer 13 is removed, this is along the entire cable length. This is shown in FIGS. 5 and 6.

Figure 7:
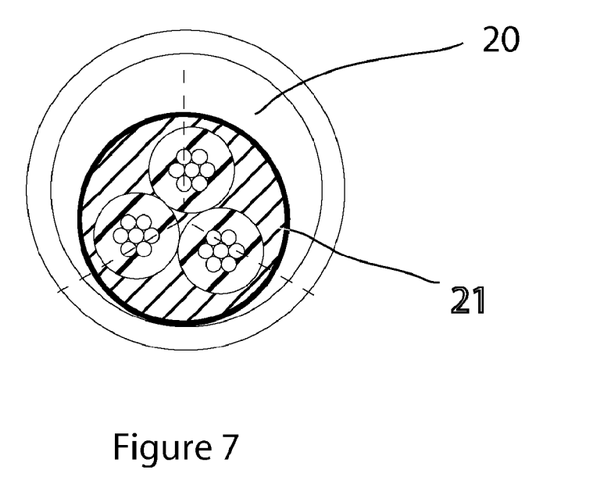
FIGS. 7 and 8 show cross sectional views of another embodiment of the cable and jacket installed in coiled tubing.
Figure 8:
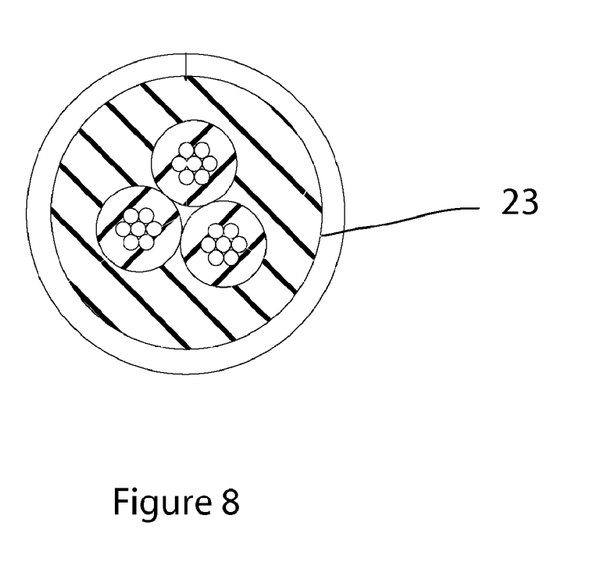
Figure 9A:
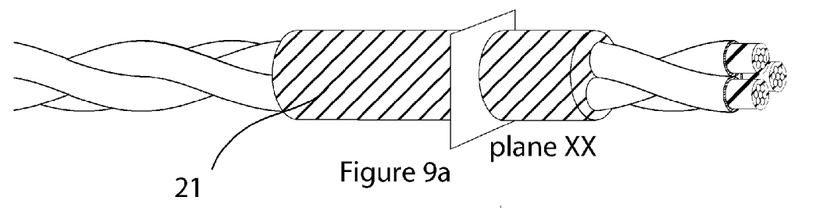
FIGS. 9a and 9b show perspective and sectional views of the cable during fabrication.
Figure 9B:
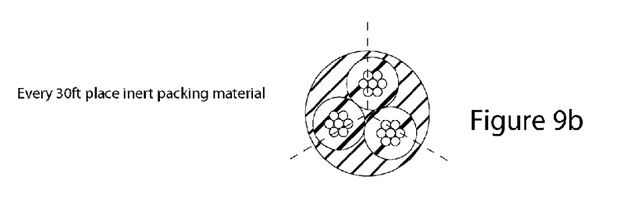
Figure 10A:
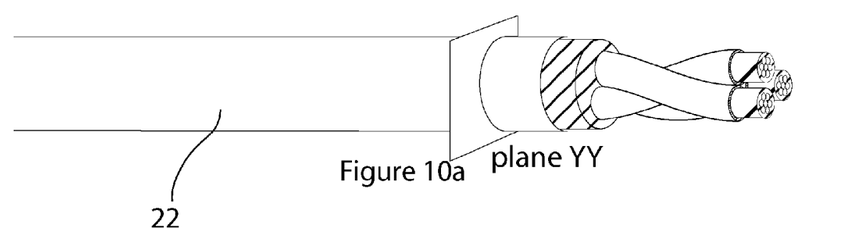
FIGS. 10a and 10b show perspective and sectional views of the cable at a later stage of fabrication.
Figure 10B:
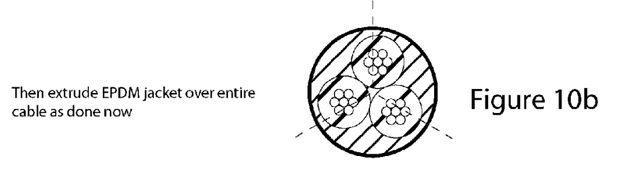
Figure 11:
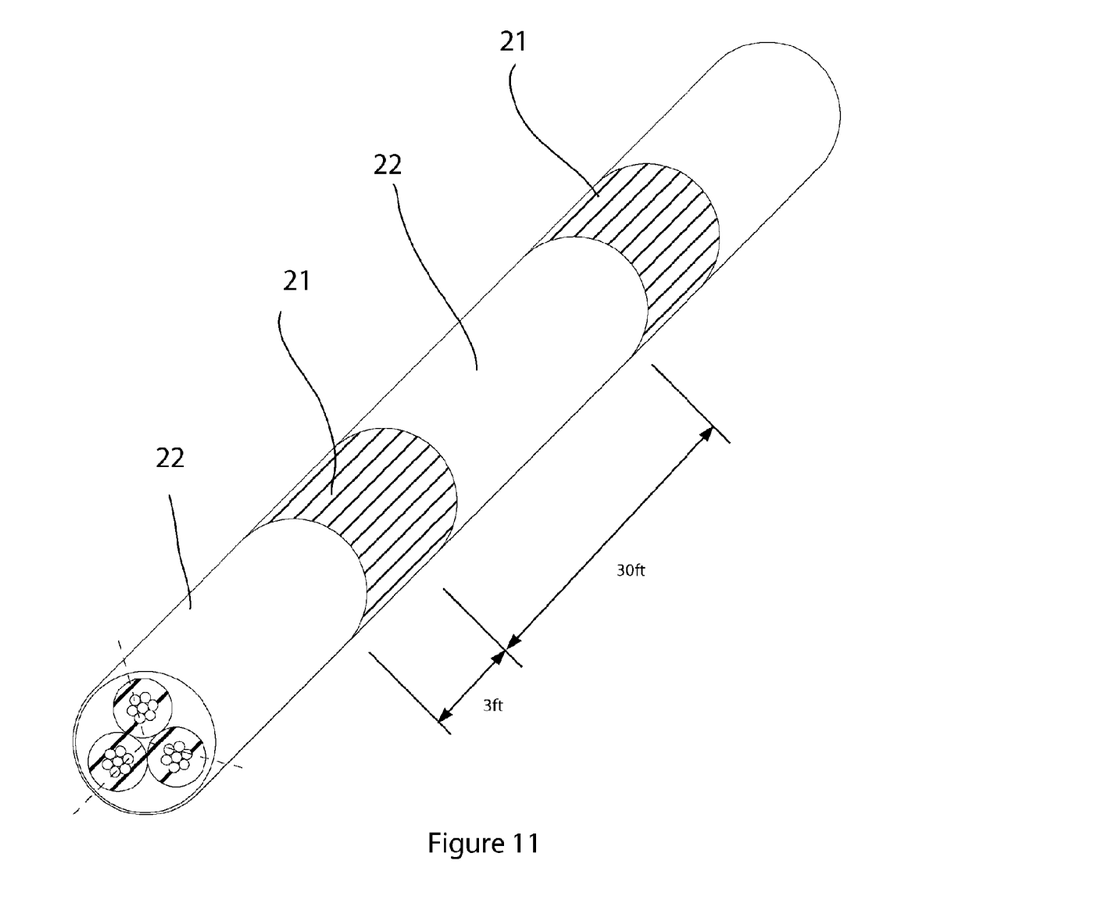
FIG. 11 shows a perspective view of the cable after fabrication.
Figure 12A:
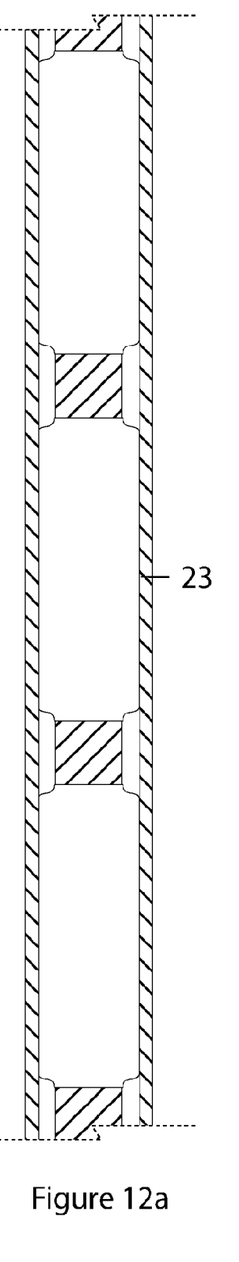
FIGS. 12a and 12b show longitudinal views of the cable and jacket installed in coiled tubing.
Figure 12B:
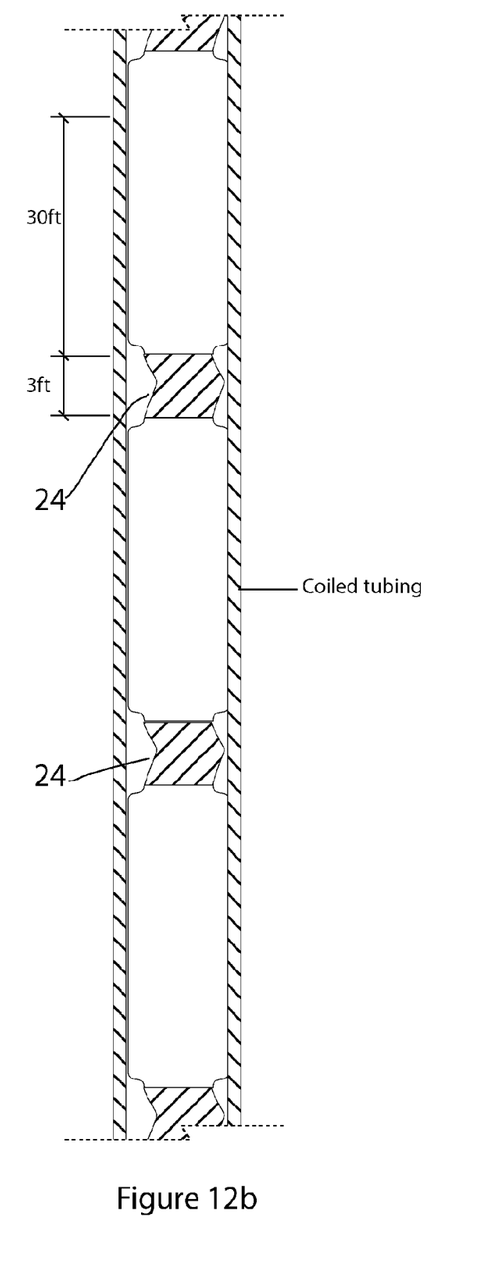
Figure 13:
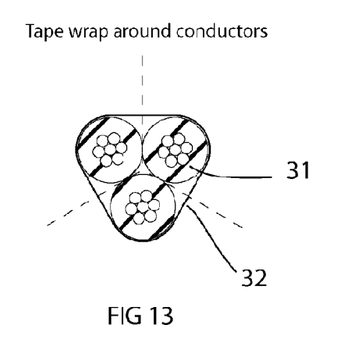
FIGS. 13 and 14 show cross sectional views of another embodiment of the cable and jacket at different stages of fabrication.
Figure 14:
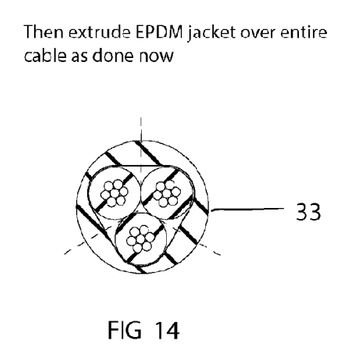
Figure 15:
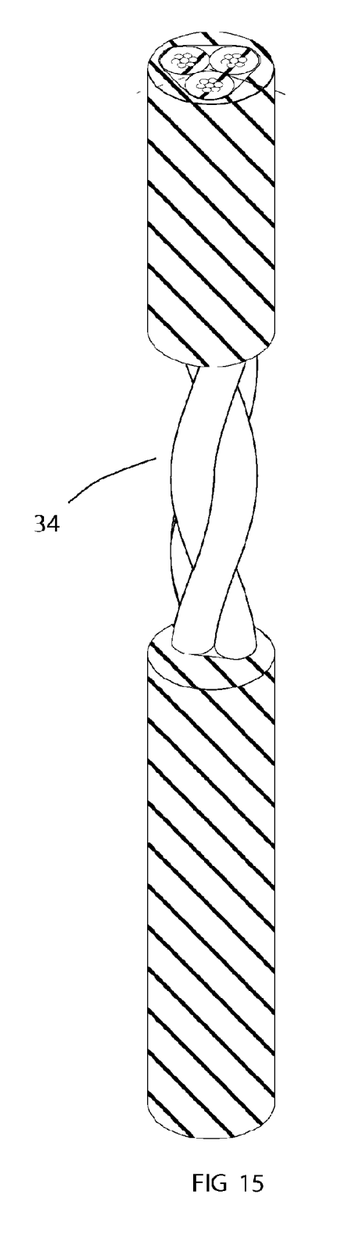
FIG. 15 shows a perspective view of the cable and jacket at a later stage of fabrication.
Figure 16:
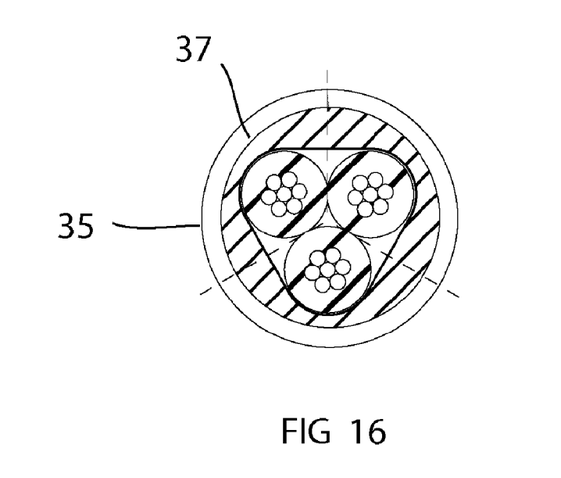
FIGS. 16 and 17 show cross sectional views of the cable and jacket installed in coiled tubing, taken at different points along the length of the cable.
Figure 17:
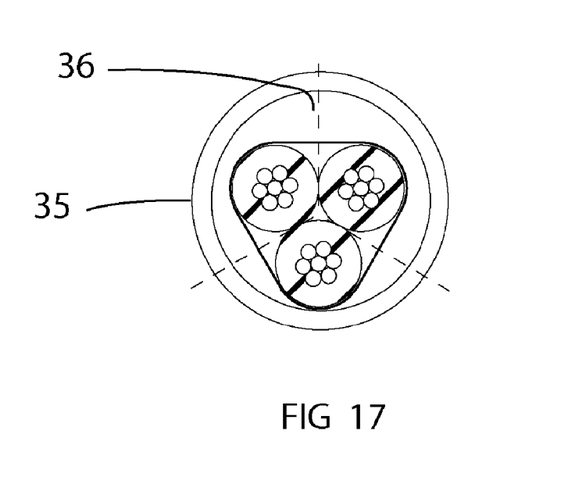

Alternatively, no protective PTFE barrier is included, but every 30 ft or so a section of jacket which is inert to expansion is included. Referring to FIGS. 7 to 12, once the conductors are wound together in a helix, every 30 ft or so an inert material (by which is meant a material that does not appreciably swell upon exposure to diesel or which ever hydrocarbon is to be used) such as the modelling clay sold under the name plasticene (r) 21 is moulded around the conductors to form a cylindrical section as shown in FIG. 7, for about a 3 ft length of the assembly. This is repeated at 30 foot intervals along the entire length of the cable. The cable then has a conventional jacket 22 applied to form a cylindrical section in the regions where plasticene (r) has not been used, so creating a smooth OD along the cable's entire length. This provides a good sealing surface for the cable to pass through the cable injection machine seal 6.

The cable is now supported virtually along its entire length via these distributed intimate contact points between itself and the ID of the coiled tubing 22. However, it is also important to accommodate the difference in thermal expansion of copper and steel. For a 5000 ft length of coiled tubing the copper conductors will get approximately 45 inches longer over this length. Therefore this additional length is accommodated in the annular space 24 between the expanded jacket supports 22. If for example the expanded jacket supports 22 are every 30 ft then the annular space between them would only have to accommodate 0.3 inch thermal expansion difference.

Referring to FIG. 13 to 17, electrical conductors are twisted together 31, and a tape layer 32 wrapped over the three conductors. Then a jacket 33 is extruded over the outside of the tape wrapped layer 32. Then sections of the jacket are removed, typically every 30 ft of jacket a section 34 of 3 ft is removed. The tape layer helps prevent any damage to the electrical conductors. This is repeated along the entire length of the cable.

The cable is then installed into a seam welded tube called coiled tubing 35, this is either done by laying the coiled tubing out on a flat surface, or installed using a cable injector and viscous drag of a fluid to pull the cable into a long reel of coiled tubing on a drum.

Figure 18:
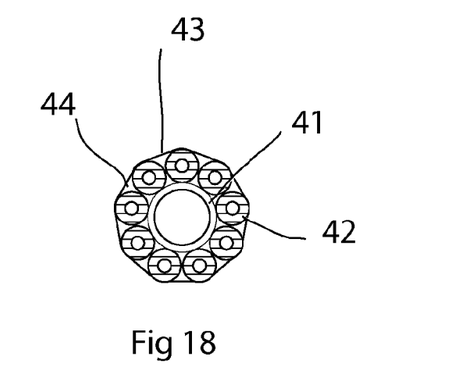
FIGS. 18 to 20 shows cross sectional views of another embodiment of the cable and jacket at different stages of fabrications
Figure 19:
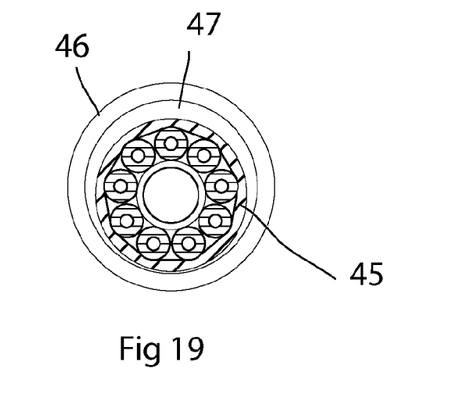
Figure 20:
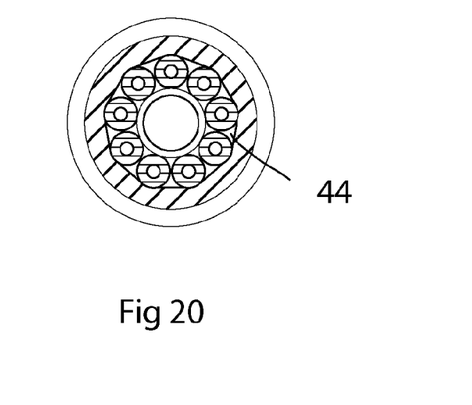

Referring to FIGS. 18 to 20, a central tube 41 has several electrical cables 42 wound around its outside, each following a helical path. Over these cables 42 a tape 43 is wound to hold the cables in place and create a flow area 44. Next an elastomer is extruded over the tape 45. Along the bundle's length, lengths of the elastomer jacket 45 are removed to create gaps (not shown) between the remaining lengths of the elastomer jacket. The bundle is now lubricated and slid into the inside of a continuous tube 46, which may be thousands of feet in length. Once fully installed, a diesel or other oil swelling agent 47 is pumped into the annular space between the bundle and the continuous tube, the diesel reacting with the jacket 45 where it is fitted so that it swells and forms an intimate contact with the inside surface of the tubing. Where there is no jacket in the annular space the diesel can be removed by circulating another fluid or gas via the common passage 4.

Figure 21:
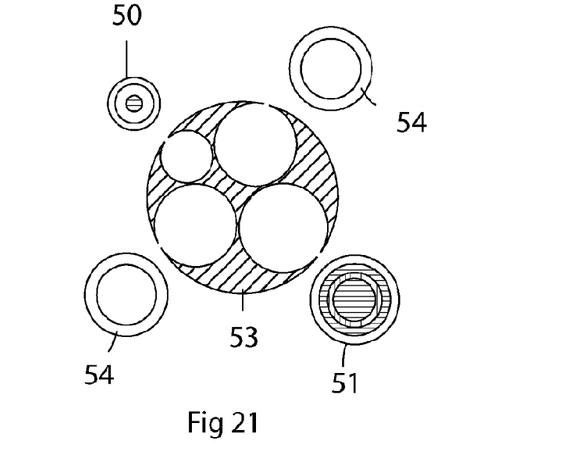
FIGS. 21 to 23 shows cross sectional views of another embodiment of the cable and jacket at different stages of fabrications and during installation into coiled tubing.
Figure 22:
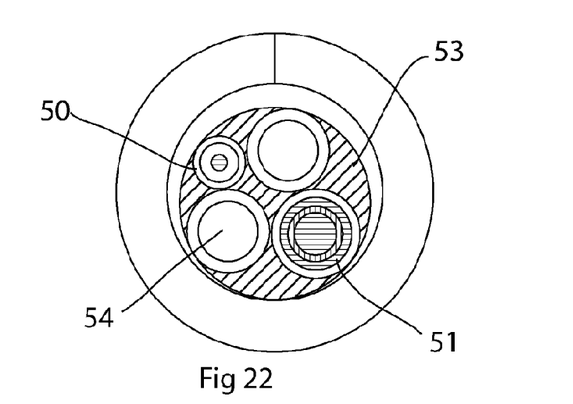
Figure 23:
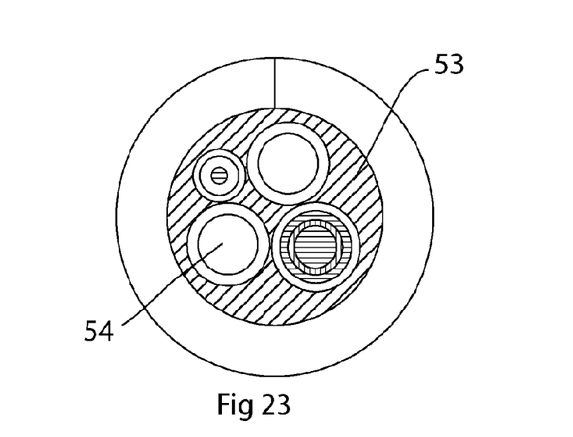
Figure 24A:
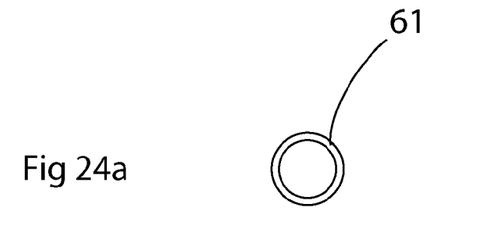
FIGS. 24a to 24d are cross sections showing the sequential construction of a further embodiment of the invention.
Figure 24B:
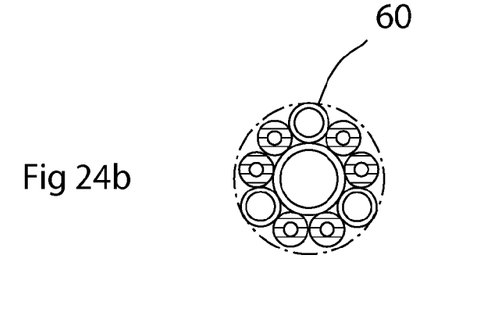
Figure 24C:
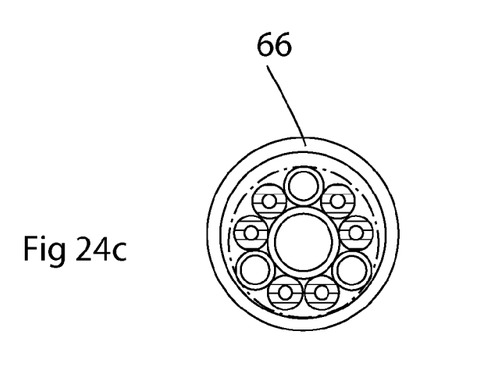
Figure 24D:
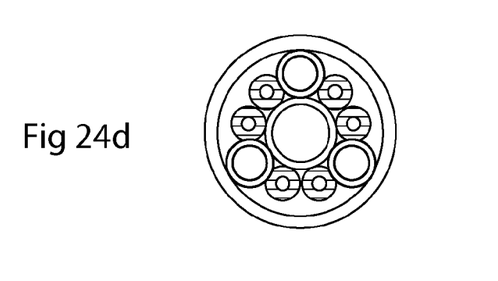

Referring to FIGS. 21 to 22 there is shown a fibre-optic cable 50 and an electrical cable 51 which cannot support there own weight, but when installed inside a larger tube 52, can be secured to the inside surface of the larger tube by swellable anchor material 53. The swellable anchor 53 is an extrusion, with holes in it suitable to accommodate cables 50 and 51 and tubes 54. The tubes 54 are present to allow the passage of fluid once the anchor 53 has been swollen. Again the same mechanism is used to swell the anchor once it is in the correct position inside the larger tube, as shown in FIG. 23

FIGS. 24a to 24d shows a further embodiment of this invention, expandable steel hydraulic tubes 60 are distributed around the circumference of the inner tube 61, interspersed with electric cables 62. The whole assembly is pulled into the larger continuous tube 66, the steel hydraulic tubes 60 protecting the electric cables 62. Once installed the tubes 60 are either expanded by one of many means such as pumping a small expansion mandrel down there length under pressure.

Once expanded they support the inner tube and provide space along the assemblies entire length for the electrical cables to get longer as a consequence of differential expansion due to temperature.

Figure 25:
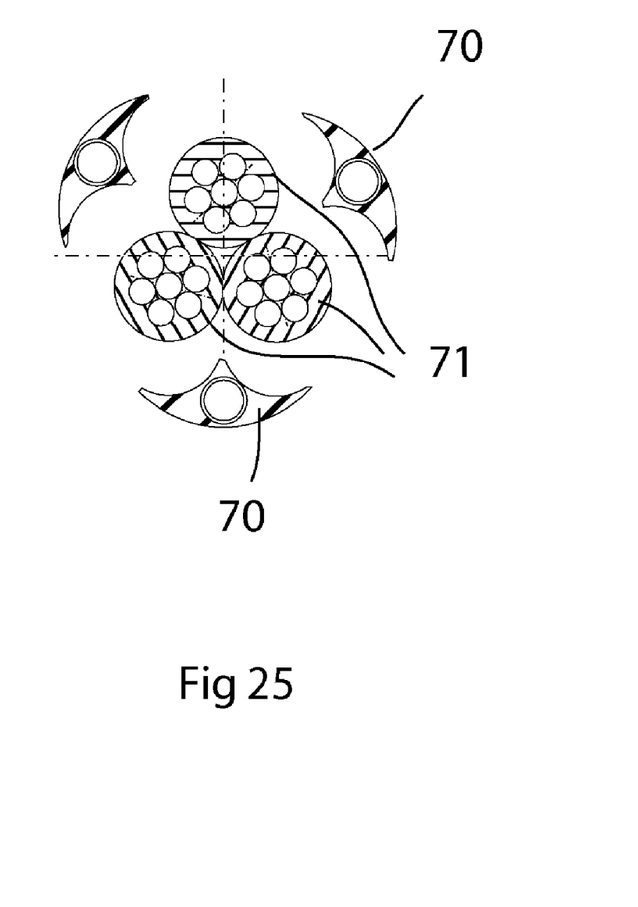
FIG. 25 is a cross section through yet another embodiment of the invention.

Referring to FIG. 25, small extruded sections 70 of swellable elastomer are fitted around a three phase power cable. Each elastomer portion includes an axial tube or flow path running through it. They would be several feet long and once fitted would be taped to hold them in place. Many of these would be placed along the cable assembly at regular intervals. The cable would then be twisted, a standard requirement for cables prior to installation inside the larger continuous tube. As for the previous embodiments, diesel or some other hydrocarbon or fluid which causes the elastomer to expand is pumped through the continuous tube, so that the expansion of the elastomer portions causes the cables to be held in position in the continuous tube.

Rather than using an elastomer that is swellable through contact with a hydrocarbon, a heat expandable and curable resin may instead be used. The resin may, for example, be extruded in the same way as described above using the swellable elastomer, and then injected into the tube as herein described.

Heat may be generated using the electrical cables present, or ambient heat from the if the reel is put in a large oven, to cause the resin to expand and set, so anchoring the cable bundle. The composition of resins is discussed in US2001020053.

The invention claimed is:

1. A method of installing a cable in coiled tubing for use in downhole wells, the method comprising the steps of:
   extruding a jacket around the cable with a plurality of longitudinally spaced expandable cylindrical portions separated by longitudinally spaced nonexpandable cylindrical portions,
   installing the cable and jacket in the coiled tubing, and
   expanding only the longitudinally spaced expandable portions of the jacket into engagement with the tubing and thereby securing the cable in the coiled tubing while leaving the cable unsecured at the nonexpandable portions between the expandable portions.

2. The method according to claim 1 wherein the expandable portions of the jacket are expanded by the application of heat.

3. The method according to claim 1 wherein the expandable portions of the jacket are expanded by the application of a liquid hydrocarbon.

4. The method according to claim 1 further comprising the step of making the jacket discontinuous along the length of the power cable.

5. The method according to claim 4, wherein the jacket is made discontinuous by interspersing the expandable portions of the jacket with the nonexpandable portions.

6. The method according to claim 1, further comprising the step of
   forming a flowpath to allow the passage of fluid after the expandable portions of the jacket have been expanded.

7. A method of installing a cable in coiled tubing for use in downhole wells, the method comprising the steps of:
   extruding an expandable jacket around the cable;
   coating longitudinally spaced portions of the expandable jacket with a layer impermeable to hydrocarbons and leaving the expandable jacket exposed between the coated portions;
   inserting the cable and expandable jacket longitudinally into the coiled tubing; and
   filling a space between the expandable jacket and the tubing with a hydrocarbon to expand the jacket only between the longitudinally spaced coated portions and thereby longitudinally secure the cable in the coiled tubing only between the longitudinally spaced coated portions.

* * * * *